US008371288B2

(12) United States Patent
King

(10) Patent No.: US 8,371,288 B2
(45) Date of Patent: Feb. 12, 2013

(54) SOLAR COLLECTOR/HEAT EXCHANGER

(76) Inventor: Louis T. King, Phoenix, AZ (US)

( * ) Notice: Subject to any disclaimer, the term of this patent is extended or adjusted under 35 U.S.C. 154(b) by 240 days.

(21) Appl. No.: 12/755,726

(22) Filed: Apr. 7, 2010

(65) Prior Publication Data

US 2011/0247605 A1 Oct. 13, 2011

(51) Int. Cl.
*F24J 2/22* (2006.01)

(52) U.S. Cl. ......... 126/675; 126/643; 126/648; 165/170

(58) Field of Classification Search .................. 126/643, 126/625, 675, 648, 651, 674, 654; 165/166, 165/168, 185, 180, 48.2, 102, 10, 170
See application file for complete search history.

(56) References Cited

U.S. PATENT DOCUMENTS 3,957,109 A * 5/1976 Worthington ................ 165/48.2
4,219,012 A * 8/1980 Bergen .......................... 126/619
4,282,856 A * 8/1981 Stehl et al. .................... 126/706
4,432,346 A * 2/1984 Westerstrandh et al. ..... 126/669
4,858,594 A * 8/1989 McCurdy ...................... 126/672
4,867,134 A * 9/1989 O'Brien ........................ 126/675
2012/0000637 A1* 1/2012 Vannman et al. ............. 165/185

* cited by examiner

*Primary Examiner* — Kenneth Rinehart
*Assistant Examiner* — Jorge Pereiro
(74) *Attorney, Agent, or Firm* — Parsons & Goltry; Robert A. Parsons; Michael W. Goltry

(57) ABSTRACT

A solar collector/heat exchanger includes a first panel of corrugated heat conductive material, a second panel of corrugated heat conductive material, and a third panel of corrugated material. A mounting structure mounts the first and second panels with the third panel sandwiched between the first and second panels. The mounting structure further defines an air flow path across the first and second panels. The corrugations of the first and second panels extend parallel to the air flow path and the corrugations of the third panel extend perpendicular to the air flow path so as to cause turbulence in air passing between the first and second panels.

6 Claims, 2 Drawing Sheets

FIG. 1
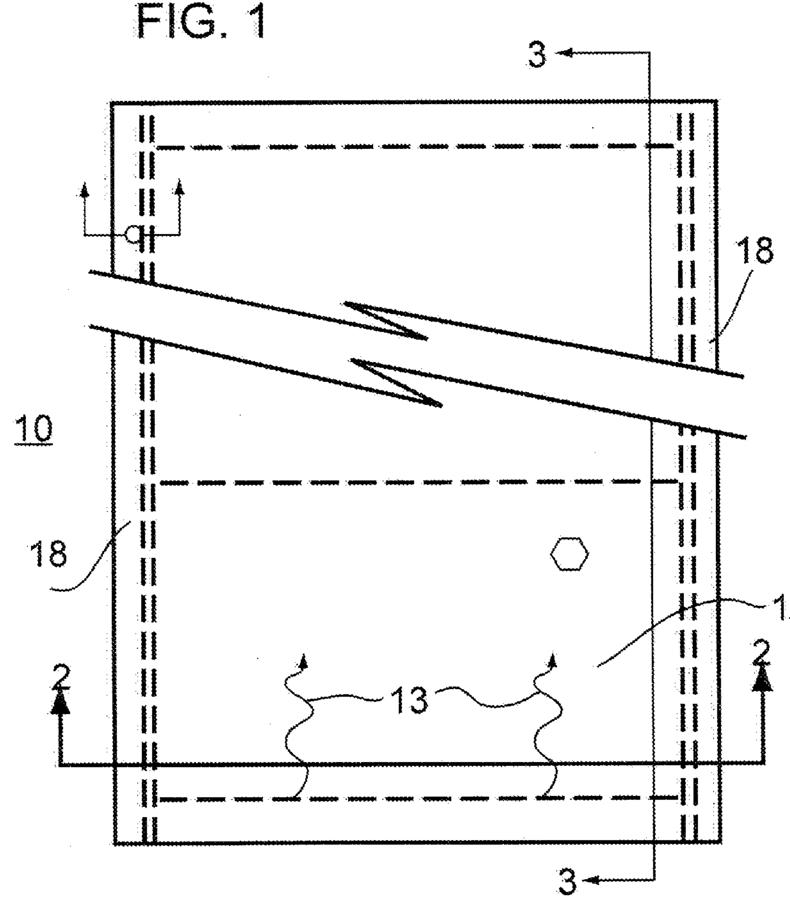
FIG. 3
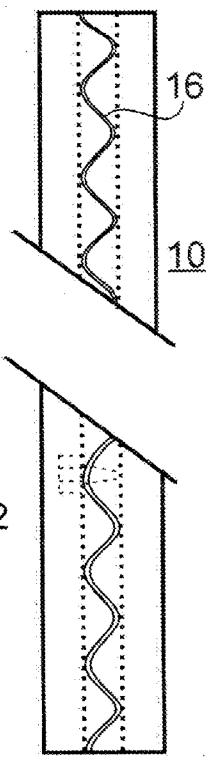
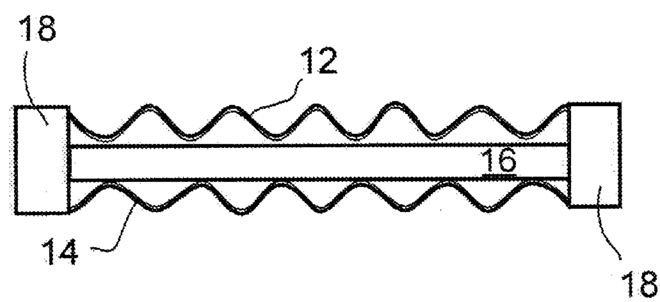
FIG. 2

SOLAR COLLECTOR/HEAT EXCHANGER

FIELD OF THE INVENTION

This invention relates to solar heating systems.

More particularly, the present invention relates to a collector/heat exchanger for use in solar heating systems.

BACKGROUND OF THE INVENTION

In the field of solar heating, there are a number of different ways to absorb the suns rays and to heat a selected area structure. In the past one of the primary systems utilize water as the carrier. In such systems the water is exposed to solar radiation by way of pipes and reflectors generally positioned on the roof. The heated water is then circulated through radiators located in the area to be heated. One problem with these systems is that the closed water circulating system is prone to leaks, rust, etc. Also, the water has a tendency to cause various growths and if not circulated continuously in many instances has to be regularly drained and replaced after the circulating system is cleaned.

In some solar heating systems air is simply circulated across various types of collectors or radiators. The collectors or radiators may be located in the area to be heated or the air is simply directed into the area to be heated after passing over them. These systems are generally inefficient because the air has a tendency to stratify with a lair of warmer air slowing next to the collectors or radiators and a lair of cooler air simply moving past the lair of warmer air without being substantially affected.

It would be highly advantageous, therefore, to remedy the foregoing and other deficiencies inherent in the prior art.

An object of the present invention is to provide a new and improved solar collector/heat exchanger.

Another object of the present invention is to provide a new and improved solar collector/heat exchanger that is more efficient.

Another object of the present invention is to provide a new and improved solar collector/heat exchanger that is inexpensive to construct and maintain.

Another object of the present invention is to provide a new and improved solar collector/heat exchanger that directly heats air without requiring other mediums, such as water and the like.

Another object of the present invention is to provide a new and improved solar collector/heat exchanger that can be easily incorporated into virtually any structure that is to be heated.

SUMMARY OF THE INVENTION

Briefly, to achieve the desired objects and aspects of the instant invention in accordance with a preferred embodiment thereof, provided is a solar collector/heat exchanger including a first panel of corrugated heat conductive material, a second panel of corrugated heat conductive material and a third panel of corrugated material. A mounting structure mounts the first and second panels with the third panel sandwiched between the first and second panels. The mounting structure further defines an air flow path across the first and second panels. The corrugations of the first and second panels extend parallel to the air flow path and the corrugations of the third panel extend perpendicular to the air flow path so as to cause turbulence in air passing between the first and second panels.

The desired objects and aspects of the instant invention are further achieved in accordance with a preferred method of heating air by solar radiation comprising the step of providing a solar collector/heat exchanger including first, second, and third panels of corrugated heat conductive material and a mounting structure mounting the first and second panels with the third panel sandwiched between the first and second panels, the mounting structure further defining an air flow path across the first and second panels, the corrugations of the first and second panels extending parallel to the air flow path and the corrugations of the third panel extending perpendicular to the air flow path. The method further includes the steps of directing solar radiation onto the first panel; directing air to be warmed into the air flow path along the outer surface of the first panel and along the outer surface of the second panel to produce partially warmed air; and directing the partially warmed air from the surface of the second panel to the third panel sandwiched between the first and second panels, whereby the partially warmed air becomes heated air for heating an area.

BRIEF DESCRIPTION OF THE DRAWINGS

Specific objects and advantages of the instant invention will become readily apparent to those skilled in the art from the following detailed description of a preferred embodiment thereof taken in conjunction with the drawings, in which:

FIG. 1 is a front view of a solar collector/heat exchanger in accordance with the present invention;

FIG. 2 is a simplified sectional view as seen from the line 2-2 of FIG. 1;

FIG. 3 is a simplified sectional view as seen from the line 3-3 of FIG. 1.

DETAILED DESCRIPTION OF THE PREFERRED EMBODIMENT

Figure 4:
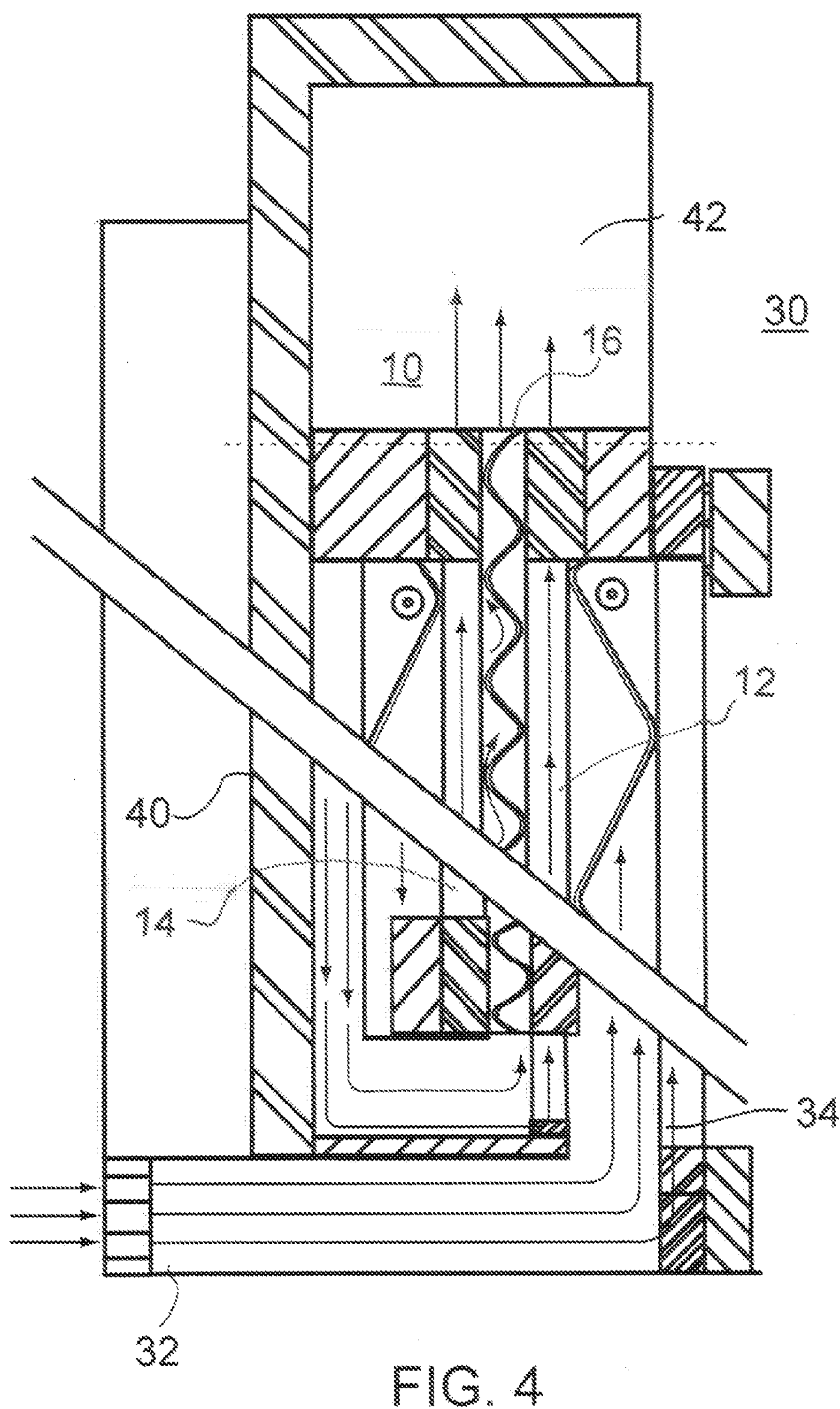
FIG. 4 is a simplified sectional/air flow diagram of a complete solar heating system incorporating the solar collector/heat exchanger of FIG. 1.

Turning now to the drawings in which like reference characters indicate corresponding elements throughout the several views, attention is first directed to FIGS. 1-3 which illustrate a solar collector/heat exchanger 10 in accordance with the present invention. Exchanger 10 includes a solar heat collector panel 12, a heat radiator panel 14, and a turbulator/heat radiator panel 16 sandwiched between panels 12 and 14. In the preferred embodiment all three panels 12, 14, and 16 are corrugated heat conductive material, such as sheets of corrugated steel, corrugated aluminum, etc. All three panels 12, 14, and 16 are held in place by some mounting structure 18, such as the side closures illustrated, which may be any material, such as wood, heavy insulation material (e.g. plastic, etc.) that is used to mount and hold the three panels in the correct orientation and to mount exchanger 10 in a solar heating system (described in more detail below). It will be understood that any mounting structure 18 can be devised to hold the three panels in the desired orientation.

As can be seen from the combination of FIGS. 2 and 3, corrugated panels 12 and 14 are mounted with the corrugations (channels or valleys) extending from the bottom of exchanger 10 (as seen in FIG. 1) to the top. Corrugated panel 16 is mounted with the corrugations extending from one side closure 18 to the other side closure 18. Thus, the corrugations of corrugated panel 16 sandwiched between corrugated panels 12 and 14 extend perpendicular to the corrugations of corrugated panels 12 and 14.

In the operation of exchanger 10 for purposes of heating, solar radiation is directed onto solar heat collector panel 12 from the outside of exchanger 10. Air to be warmed is directed along the outer surface of solar heat collector panel 12 and heat radiator panel 14 in an air flow path indicated by arrows 13. This can generally be accomplished, for example, by directing incoming air upwardly across solar heat collector panel 12 and downwardly across heat radiator panel 14. The partially heated air is then directed upwardly between solar heat collector panel 12 and heat radiator panel 14. As the air travels upwardly between panels 12 and 14, the perpendicular corrugations of panel 16 act to create turbulence in the flowing air. The turbulence in the upwardly flowing air prevents stratification and increases the exchange of heat from all three panels to the upwardly flowing air.

In some specific applications it may be desirable (for cost or weight concerns) to form turbulator/heat radiator panel 16 of corrugated material that is not necessarily heat conductive, such as plastic corrugated sheet material. Since one of the prime functions of panel 16 is to provide turbulence to air traveling through exchange 10, plastic corrugated sheet material would perform that function. Additionally, turbulator panel 16 can be formed of a sheet of expanded metal that has been corrugated. Using an expanded metal sheet instead of a solid sheet will promote airflow while maintaining the desired turbulence. However, in the preferred embodiment all three panels 12, 14, and 16 are formed of or coated with a heat conductive material so that air is warmed by each of the panels and because the panels are sandwiched together some heat is transferred directly between panels.

Here it will be understood that solar collector/heat exchanger 10 can also be used for cooling during summers and in high heat areas. For the cooling exchange panel 12 is simply exposed to cooler air, etc. Thus, panels 12, 14, and 16 become cooler and exchange the cold with warmer air moving over them in the manner described above.

Turning now to FIG. 4, one example of a complete solar heating system 30 incorporating solar collector/heat exchanger 10 is illustrated. The illustration is a simplified sectional view showing the preferred air flow through system 30. A floor inlet register 32 is positioned on the floor below a window 34. An exchanger 10 is mounted above register 32 and in window 34 so that solar radiation is directed onto solar heat collector panel 12 of exchanger 10. An enclosure 40 is formed to enclose and mount exchanger 10, preferably in an insulated area. Also, enclosure 40 forms a discharge manifold 42 above exchanger 10 and in air communication with an area to be heated.

Air flow in a preferred arrangement is illustrated in FIG. 4. It will be understood however that other air flow arrangements may be provided if desired. As indicated by various arrows in FIG. 4, air to be heated is directed through floor inlet register 32 and upwardly across solar heat collector panel 12. At least some of the partially heated air is directed downwardly across the outer surface of heat radiator panel 14. The partially heated air is then directed upwardly between heat collector panel 12 and heat radiator panel 14 where the perpendicular corrugations of panel 16 create turbulence in the flowing air. The turbulence in the upwardly flowing air prevents stratification and increases the exchange of heat from all three panels to the upwardly flowing air. The upwardly flowing heated air is then directed into discharge manifold 42 where the heated air is directed into the area to be heated. Also, as explained above, during excessively warm periods, solar heat collector panel 12 can be subjected to cold (e.g. opening window 34, shading window 34, etc.) to produce cooler air.

Thus, a new and improved solar collector/heat exchanger is disclosed that is more efficient than prior heat exchangers. Also, the new and improved solar collector/heat exchanger is inexpensive to construct and maintain and can be easily incorporated into virtually any structure that is to be heated. The new and improved solar collector/heat exchanger directly heats air without requiring other mediums, such as water and the like, which greatly simplifies the construction and maintenance.

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

The invention claimed is:

1. A solar heating system comprising:

a solar collector/heat exchanger including a solar heat collector panel of corrugated heat conductive material, a heat radiator panel of corrugated heat conductive material, a turbulator/heat radiator panel of corrugated material, and a mounting structure mounting the solar heat collector panel and the heat radiator panel with the turbulator/heat radiator panel sandwiched between the heat collector panel and the heat radiator panel, the mounting structure further defining an air flow path across the solar heat collector panel and the heat radiator panel, the corrugations of the solar heat collector panel and the heat radiator panel extending parallel to the air flow path and the corrugations of the turbulator/heat radiator panel extending perpendicular to the air flow path; and an enclosure defining an unheated air inlet and a heated air outlet and mounting the exchanger with the air flow path positioned between the unheated air inlet and the heated air outlet, the mounting structure being formed to direct unheated air over an outside surface of the heat collector panel, to direct partially heated air from the heat collector panel over an outside surface of the heat radiator panel and to direct partially heated air from the heat radiator panel over the turbulator/heat radiator panel and subsequently to the heated air outlet.

2. A solar heating system as claimed in claim 1 wherein the enclosure further includes an external access to solar radiation.

3. A solar collector/heat exchanger as claimed in claim 1 wherein the heat collector panel and the heat radiator panel both include one of corrugated aluminum sheets and corrugated steel sheets.

4. A solar collector/heat exchanger as claimed in claim 1 wherein the turbulator/heat radiator panel of corrugated material includes heat conductive material.

5. A solar collector/heat exchanger as claimed in claim 4 wherein the turbulator/heat radiator panel of corrugated heat conductive material includes one of corrugated aluminum sheet material and corrugated steel sheet material.

6. A method of heating air by solar radiation comprising the steps of:

providing a solar collector/heat exchanger including first, second, and third panels of corrugated heat conductive material and a mounting structure mounting the first and second panels with the third panel sandwiched between the first and second panels, the mounting structure further defining an air flow path across the first and second panels, the corrugations of the first and second panels extending parallel to the air flow path and the corrugations of the third panel extending perpendicular to the air flow path;

directing solar radiation onto the first panel;

directing air to be warmed into the air flow path along the outer surface of the first panel and air from the outer surface of the first panel along the outer surface of the second panel to produce partially warmed air; and directing the partially warmed air from the surface of the second panel to the third panel sandwiched between the first and second panels, whereby the partially warmed air becomes heated air for heating an area.

* * * * *